Figure 1:
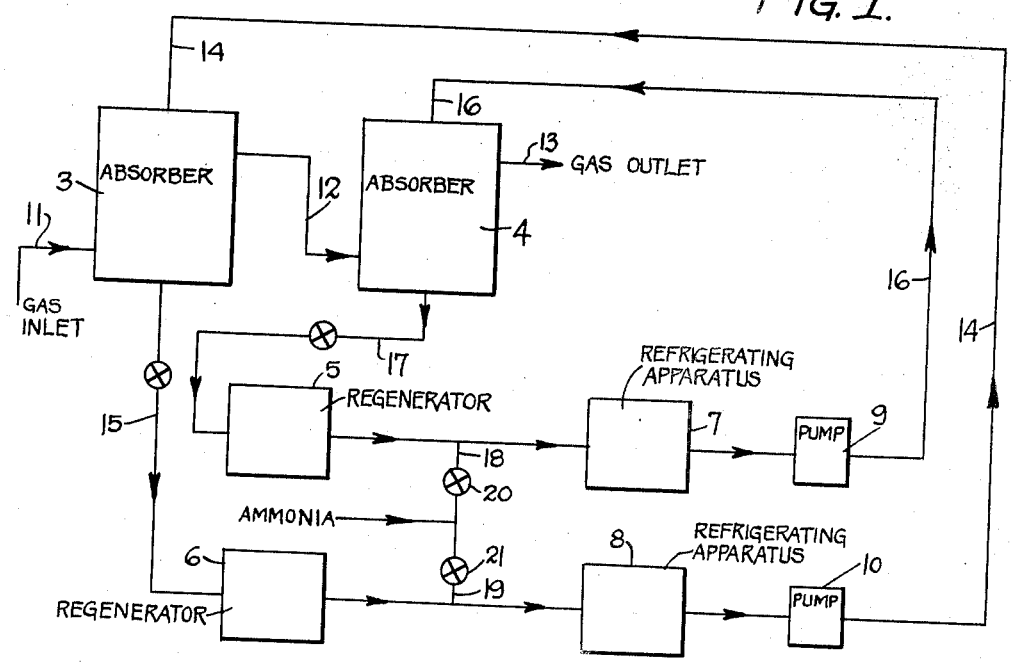

June 12, 1934.  R. S. RICHARDSON  1,962,525
PROCESS OF PURIFYING GASES
Filed June 16, 1931

INVENTOR
RALPH S. RICHARDSON
BY HIS ATTORNEY

Patented June 12, 1934

1,962,525

UNITED STATES PATENT OFFICE 1,962,525

PROCESS OF PURIFYING GASES

Ralph S. Richardson, Teaneck, N. J., assignor to Chemical Engineering Corporation, New York, N. Y., a corporation of Delaware Application June 16, 1931, Serial No. 544,830

3 Claims. (Cl. 23—2)

My invention relates to improved methods of purifying gases and more particularly to the removal from gases of impurities absorbable in copper solutions such as oxygen, carbon monoxide, carbon dioxide, etc., and my improved methods are particularly applicable in the purification of a nitrogen-hydrogen mixture for ammonia synthesis.

One method for preparing a suitable synthesis gas consists in oxidizing with steam a gas containing hydrogen, nitrogen and carbon monoxide, in such proportions that the resulting gas mixture contains one part nitrogen, three parts hydrogen, carbon dioxide and small amounts of carbon monoxide. This gas mixture is usually compressed, and most of the carbon dioxide is removed by absorption in water to give a resulting nitrogen-hydrogen mixture containing certain impurities, but in which the ratio of hydrogen to nitrogen is such that after subsequent purification it may be used for synthesis of ammonia.

Solutions of copper salts have been found to be particularly efficacious in removing from the nitrogen-hydrogen gas mixture such impurities as oxygen and oxides of carbon, especially those copper solutions containing organic cuprous ammonium salts, and free ammonia. The usual method of using such copper solutions to effect the purification of the nitrogen-hydrogen gas mixture is to scrub the gas mixture under pressure in a packed tower, passing the gas upwardly in counter-current flow to the descending solution.

The solution containing the impurities is then regenerated by heat, and after cooling and adjustment of its composition, may be reused for the purification.

I have discovered that the presence of a considerable excess of free ammonia in copper solution is of distinct advantage, particularly as regards the removal of the final traces of carbon monoxide and carbon dioxide. The use of a strongly ammoniacal solution, however, has always presented the disadvantage that during the process of regenerating the copper solution and freeing it from oxygen, carbon monoxide, and carbon dioxide, the losses of ammonia from the solution are much higher in case a strongly ammoniacal solution has been used than if the solution is only weakly ammoniacal.

It is also known that refrigerated copper solutions have greater capacity for absorbing carbon monoxide than those solutions which have been cooled only to ordinary temperatures, and that particularly for the removal of the last traces of carbon monoxide, the colder the solution, the lower will be the partial pressure of the solution with respect to carbon monoxide, and the more complete will be the removal of the last traces of carbon monoxide. The disadvantage of cooling the copper solution to temperatures below 0° C. is that this operation entails considerable investment cost for apparatus and increased operating expenses for the necessary power to attain such refrigeration.

I have discovered that the advantages obtained by using a high concentration of ammonia and a low temperature in the copper solution may be obtained from my methods without encountering the hereinbefore enumerated disadvantages. My invention consists essentially in dividing the copper solution into two parts and effecting the washing of the gases in two successive stages.

According to my invention the gases to be purified are washed first with a copper solution, which is neutral or which contains not in excess of 3% free ammonia over and above that necessary to form ammonium salts with the acid radicals present in the solution, and such gases are subsequently washed with a more strongly ammoniacal copper solution containing from 5% to 10% free ammonia over and above that necessary to combine with the acid radicals in the solution.

Another feature of my invention consists in using for the first stage of scrubbing copper solutions which have been refrigerated to 0° to 10° C., or slightly below temperatures obtained with ordinary cooling water, and in using for the second stage of scrubbing copper solutions refrigerated to lower temperatures, between 0° and —10° C.

I have discovered that a relatively large quantity of solution varying between 60 and 90% of the total, used in the first stage scrubbing step suffices to remove almost completely the bulk of the impurities present in the gas, and that in the second stage a relatively smaller quantity of solution, amounting to 10–40% of the total, is sufficient to remove completely any small traces of impurities left in the gas after the first step of scrubbing.

The solution used in the second step of scrubbing has absorbed only a relatively small quantity of impurities and may, if desired, be mixed with the solution to be used in the first stage of scrubbing. My improved methods result, therefore, in a complete purification of the gas by use of the copper solution, which is relatively cheap to prepare. The two solutions differ from each other only as regards temperature and content of free ammonia, and after use, may be regenerated separately, or, more simply, mixed together and then regenerated.

Figure 2:
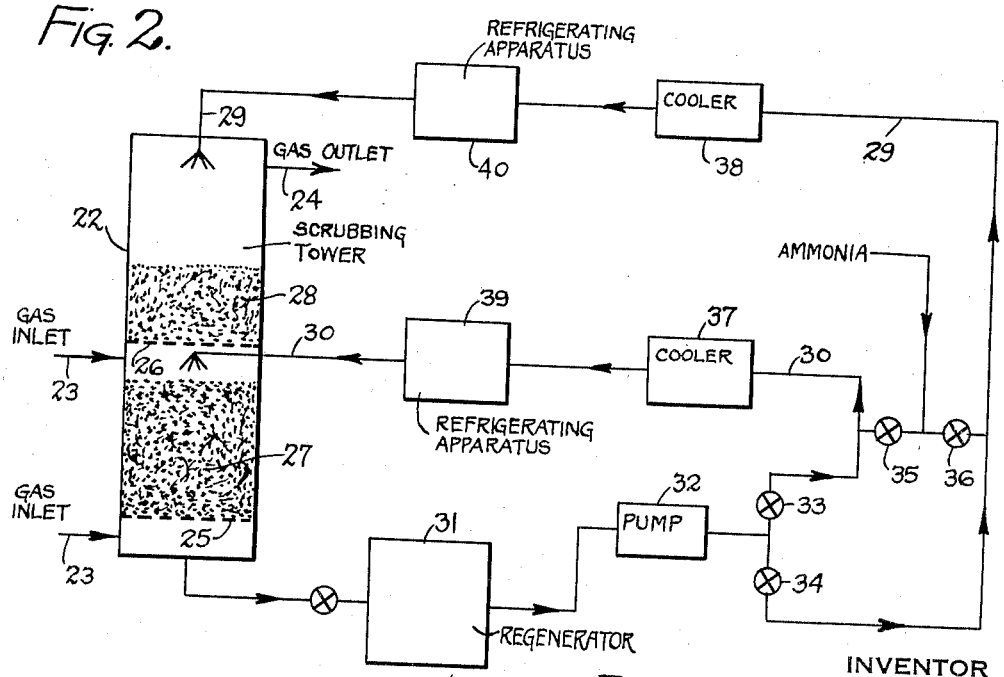

My invention may be carried out in connection with apparatus diagrammatically illustrated in Figs. 1 and 2 showing how my improved methods of procedure may be advantageously practiced.

Fig. 1 shows the essential procedure in practicing the invention. 3 and 4 represent apparatus for the absorption of impurities from the gas, 4 being placed in the system subsequent to 3. 5 and 6 show the apparatus for the regeneration of the copper solution, while 7 and 8 are apparatus for the refrigeration of such solution. The pumps 9 and 10 control the flow of copper solution to each of the absorption apparatus 3 and 4. Gas enters absorption apparatus 3 through inlet pipe 11 and flows through the pipe 12 from 3 to 4, leaving 4 through outlet pipe 13.

Regenerated copper solution enters 3 through the pipe 14 and flows from the absorption apparatus 3 through valve-controlled pipe 15 to the regenerator 6. Similarly regenerated copper solution is admitted to the absorber 4 through pipe 16 and flows from 4 to 5 through valve-controlled pipe 17. Ammonia is added to the copper solution through pipes 18 and 19 to replace ammonia losses from the solution, and the concentration of the ammonia in the two solutions is controlled by the quantity of ammonia admitted through valves 20 and 21 in the pipes 18 and 19. The temperatures of the two copper solutions leaving the refrigerating apparatus 7 and 8 and entering the absorbers 3 and 4 is controlled by the quantity of refrigeration supplied to 7 and 8, while the relative quantity of solution entering the absorbers 3 and 4 is controlled by the pumps 9 and 10.

Figure 2 shows a simplified form of apparatus and an approved method of carrying out my invention. The vertical scrubbing tower 22 is provided with gas inlet 23 and gas outlet 24, and the perforated plates 25 and 26 supporting Raschig ring packing 27 and 28, the volume of packing 27 supported on the grate 25 being about twice the volume of packing 28 supported by the grate 26. 29 and 30 are pipes through which the copper solution is injected into the tower 22. 31 represents a regenerator in which the copper solution is heated to remove the impurities absorbed in the tower 22 and is then cooled to atmospheric temperature with the available supply of cooling water. 32 is a pump to maintain a continuous circulation of the copper solution between 32 and 22. 33 and 34 are valves controlling the relative quantities of solution used for the first and second stages of scrubbing. 35 and 36 are valves controlling the quantity of ammonia added to each part of the copper solution; 37 and 38 are coolers to remove the heat of absorption of ammonia in the solution and also to cool the solution with water to as low a temperature as practical, while 39 and 40 represent coolers for refrigerating the solutions below cooling water temperature by a suitable refrigerating medium such as by a circulation of refrigerated brine or by boiling anhydrous ammonia.

A preferred copper solution containing 13% copper in the form of cuprous salt and 2% copper in the form of cupric salt may be prepared by dissolving metallic copper in 18% ammonium formate solution, air being blown through the solution to assist in dissolving the copper.

80% of the total solution delivered by pump 32 is allowed to pass through valve 33 while ammonia is added through valve 35 in such amounts that the solution contains 1% free ammonia over and above that required to combine with any acid radicals which may be present. This concentration is so low that there is practically no ammonia loss in the regeneration step, even when no ammonia recovery is provided for, and since a large proportion of the total amount of solution is used in this stage a great saving in ammonia is effected.

The solution is then cooled by water in cooler 37, refrigerated to a temperature of 10° C. in cooler 39 and injected into the tower 22 through pipe 30. The remaining 20% of the solution delivered by pump 32 is allowed to pass through valve 34, ammonia is added through valve 36 until the solution contains 6% free ammonia, while the solution is cooled by water in cooler 38, refrigerated to a temperature of 0° C. in cooler 40 and injected into the tower through pipe 29. The solution injected through pipe 30 supplemented by the solution injected through pipe 29 absorbs the greater part of the impurities from the gas stream passing through tower 22, while the solution injected through pipe 29 serves to remove the final traces of the impurities.

Various details in the apparatus used and in the procedure employed for carrying out my invention may be modified in many respects without departing from the scope of the invention and without sacrificing the benefits derived from its use.

I claim as my invention:

1. A process of purifying a gas from impurities absorbable in ammoniacal copper solutions which comprises scrubbing the gas with relatively large quantities of said copper solution at a temperature below that obtainable by ordinary cooling water having a content of free ammonia not in excess of 3% and then scrubbing the partially purified gas with a relatively small quantity of a copper solution having a greater concentration of free ammonia of from 5% to 10% and a temperature at least 10° C. lower than the first stage.

2. A process of purifying a gas from impurities absorbable in a copper solution which comprises scrubbing the gas with relatively large quantities of said copper solution having a content of free ammonia not in excess of 3% at a temperature between 0° and 10° C., and then scrubbing the partially purified gas with a relatively small quantity of a copper solution having a content of free ammonia of from 5% to 10% refrigerated to between 0° and −10° C.

3. A cyclic process of purifying a gas containing oxide of carbon as an impurity absorbable in ammoniacal copper solution which comprises scrubbing the gas with a first relatively large quantity of said solution having a free ammonia content not in excess of 3% and a temperature below that of ordinary cooling water, subsequently scrubbing said gas with a second relatively small quantity of said solution having a greater free ammonia content and a temperature at least 10° C. lower than the first, mixing the two solutions after the scrubbing operation, regenerating the mixed solution, dividing the regenerated solution into two parts, adjusting the free ammonia content of each to the desired point, and repeating the cycle of operations.

RALPH S. RICHARDSON.